(12) United States Patent
Ciarafoni et al.

(10) Patent No.: US 8,974,909 B2
(45) Date of Patent: Mar. 10, 2015

(54) RANDOM COPOLYMERS OF PROPYLENE

(75) Inventors: Marco Ciarafoni, Ferrara (IT); Monica Galvan, Rome (IT); Roberta Marzolla, Rome (IT); Paola Massari, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/812,803

(22) PCT Filed: Jul. 29, 2011

(86) PCT No.: PCT/EP2011/063057
§ 371 (c)(1),
(2), (4) Date: Jan. 28, 2013

(87) PCT Pub. No.: WO2012/013761
PCT Pub. Date: Feb. 2, 2012

(65) Prior Publication Data
US 2013/0302629 A1   Nov. 14, 2013

Related U.S. Application Data

(60) Provisional application No. 61/400,818, filed on Aug. 3, 2010.

(30) Foreign Application Priority Data

Jul. 29, 2010   (EP) ...................................... 10171178

(51) Int. Cl.
*B32B 27/32*   (2006.01)
*C08F 210/00*   (2006.01)
*C08F 210/06*   (2006.01)
*C08F 210/16*   (2006.01)
*C08J 5/18*   (2006.01)

(52) U.S. Cl.
CPC ............ *C08F 210/06* (2013.01); *C08F 210/16* (2013.01); *C08J 5/18* (2013.01); *C08J 2323/14* (2013.01)
USPC .......................................... 428/523; 526/348

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 4,971,937 A | 11/1990 | Albizzati et al. | |
| 5,095,153 A | 3/1992 | Agnes et al. | |
| 6,649,725 B2 | 11/2003 | Seta et al. | |
| 6,689,845 B1 | 2/2004 | Govoni et al. | |
| 6,818,187 B2 | 11/2004 | Govoni et al. | |
| 6,818,583 B1 | 11/2004 | Morini et al. | |
| 6,825,309 B2 | 11/2004 | Morini et al. | |
| 7,169,871 B2 | 1/2007 | Morini et al. | |
| 8,017,206 B2 | 9/2011 | De Palo et al. | |
| 8,178,632 B2 | 5/2012 | Cavalieri et al. | |
| 8,207,285 B2 | 6/2012 | Grazzi et al. | |
| 2001/0053453 A1* | 12/2001 | Seta et al. | 428/517 |
| 2010/0247375 A1 | 9/2010 | Grein et al. | |
| 2012/0220726 A1 | 8/2012 | Cavalieri et al. | |

FOREIGN PATENT DOCUMENTS

| | | |
|---|---|---|
| EP | 045977 | 2/1982 |
| EP | 728769 | 8/1996 |

* cited by examiner

*Primary Examiner* — Sheeba Ahmed

(57) ABSTRACT

Random copolymers of propylene with ethylene, and optionally other olefins, comprising from 3.5% to 6.5% by weight of ethylene and having a melt flow rate (MFR) according to ISO 1133 (230° C., 2.16 Kg) of less than 10 g/10 min and a melting temperature (Tm), determined by DSC, satisfying the relation: 45° C.≤Tm+C≤150° C. wherein C is the quantity (by weight) of ethylene in the copolymer. The random copolymers of the invention are specifically suited for cast film and/or sheet applications.

9 Claims, No Drawings

RANDOM COPOLYMERS OF PROPYLENE

This application is the U.S. National Phase of PCT International Application PCT/EP2011/063057, filed Jul. 29, 2011, claiming priority of European Patent Application No. 10171178.6, filed Jul. 29, 2010 and the benefit under 35 U.S.C. 119(e) of U.S. Provisional Application No. 61/400,818, filed Aug. 3, 2010, the contents of which are incorporated herein by reference in their entirety.

The present invention relates to random copolymers of propylene with ethylene that are specifically suited for the manufacture of mono- or multilayer polypropylene films or sheets, in particular of mono- or multilayer polypropylene cast films or sheets and of articles comprising such films or sheets. The random copolymers of the invention are particularly suitable for applications where a good balance of mechanical, thermal and optical properties is required, such as for instance in packaging applications, or for the manufacturing of pharmaceutical blisters.

The use of propylene polymers in film or sheet applications is well known in the art.

Depending on the requirements of the final application, it is common to use polypropylene homopolymers, random copolymers or heterophasic copolymers, or a mixture of these.

Propylene homopolymers are known to provide films with high melting temperature, stiffness and tensile strength, while random copolymers normally show a lower melting temperature and good optical properties, as well as slightly higher impact resistance.

However, the impact resistance of random copolymers of propylene is not always satisfactory for some applications. One straightforward possibility for improving the impact resistance of random copolymers of propylene would be that of increasing the comonomer content, however this would inevitably decrease the stiffness and deteriorate the thermal properties. Another possibility would be that of using mechanical blends of random copolymers of propylene with ethylene based plastomers, however such a solution would inevitably bring high costs.

In order to overcome these drawbacks, it has recently been proposed to manufacture well mixed reactor blends of two random copolymers of propylene, one with relatively high ethylene content and the other with relatively low ethylene content. For instance, international patent application WO 2008/012144 A1 shows propylene polymers having a total content of units deriving from at least one linear or branched alpha-olefin having 2 to 8 carbon atoms other than propylene ranging from 4.5 to 6 wt %, a melting temperature ranging from 148° C. to 160° C., and a melt flow rate from 0.1 to 25 g/10 min. In the concrete examples provided, the comonomer used is ethylene, ranging from 4.7 to 5 wt %, and the melting temperatures determined on the as-reactor polymer powder range from 149° C. to less than 152° C. After mixing in an extruder together with nucleating agents, the melting temperatures of the same concrete examples generally show an increase and they are comprised in the range from 152° C. to 154.5° C. The propylene polymers of WO 2008/012144 A1 are specifically suited for extrusion blow molding applications.

European patent application EP09172881.6 discloses polymer compositions suitable for injection-molded articles comprising (A) from 60 to 95 wt % of a copolymer of propylene containing from 2 to 10 wt % of ethylene having an as-reactor melting temperature ranging from 148° C. to 160° C.; and (B) from 5 to 40 wt % of a copolymer of ethylene comprising from 70 to 85 wt % of ethylene derived units.

In the concrete example provided for component (A), the ethylene content is equal to 3.2 wt % and the melting temperature of the as-reactor component (A) is equal to 150° C.

After mixing in an extruder together with nucleating agents, the melting temperature of the same concrete example of copolymer (A) is increased to 153° C.

International patent application WO 2008/074636 A1 shows high shrink polypropylene films having at least one layer comprising a propylene copolymer with ethylene having at least 5.5 wt % of ethylene, a melting temperature of less than 140° C., a melt flow rate of less than 10 g/10 min and a flexural modulus lower than 700 MPa. In the concrete examples provided, the propylene copolymers show an ethylene content of 7 wt % and melting temperatures ranging from 129° C. to 135° C.

Even though the prior art random copolymers of propylene, and especially the reactor blends of two random copolymers of propylene, generally provide good performances in film applications, there is still the need, in the field of polypropylene cast films and/or sheets, to provide propylene polymers with an improved balance of mechanical, thermal and optical properties.

This objective can be accomplished by providing a copolymer of propylene with ethylene comprising from 3.5% to 6.5% by weight of ethylene and having a melt flow rate according to ISO 1133 (230° C., 2.16 Kg) of less than 10 g/10 min and a melting temperature (Tm), determined by DSC, satisfying the following relation:

$$145° C. \leq Tm+C \leq 150° C.$$

wherein C is the quantity (by weight) of ethylene.

The propylene-ethylene copolymer of the invention may also optionally comprise other olefins of formula $CH_2$—CHR in which R is an alkyl group containing from 2 to 10 carbon atoms.

Preferably, the content of ethylene in the propylene-ethylene copolymer of the invention ranges from 3.8% to 5.5% by weight, more preferably from 3.8% to 5.0% by weight, even more preferably from 4.0% to 5.0% by weight.

Preferably, the melting temperature (Tm) satisfies the following relation:

$$146° C. \leq Tm+C \leq 150° C.$$

Most preferably, the melting temperature (Tm) satisfies the relation:

$$147° C. \leq Tm+C \leq 150° C.$$

In a preferred embodiment, the melting temperature (Tm) of the propylene-ethylene copolymer of the invention is comprised between 142° C. and 145° C., more preferably between 143° C. and 145° C.

In a preferred embodiment, the melt flow rate (MFR) of the propylene-ethylene copolymer is comprised between 3 g/10 min to 9 g/10 min, more preferably from 3 g/10 min to 8 g/10 min, even more preferably from 3 g/10 min to 7 g/10 min (measured according to ISO 1133 (230° C., 2.16 Kg).

Moreover, the propylene-ethylene copolymers of the present invention preferably are endowed with these properties:
- a Flexural Modulus equal to or higher than 800 MPa, preferably higher than 850 MPa;
- Haze measured on 1 mm plaques lower than 60%; preferably lower than 55%;
- an Izod impact strength (measured according to ISO 180/1A at 23° C.) equal to or higher than 5.0 kJ/m$^2$, preferably equal to or higher than 6.0 kJ/m$^2$;

an Izod impact strength (measured according to ISO 180/1A at 0° C.), equal to or higher than 3.5 kJ/m$^2$, preferably equal to or higher than 3.8 kJ/m$^2$, even more preferably higher than 4.0 kJ/m$^2$;

an Izod impact strength (measured according to ISO 180/1A at −20° C.) which is equal to or higher than 1.5 kJ/m$^2$, preferably higher than 2.0 kJ/m$^2$, even more preferably higher than 2.5 kJ/m$^2$.

The propylene copolymers of the present invention can be prepared by polymerizing the said monomers and comonomers either in the liquid or gas-phase polymerization reactors.

Preferably, each polymerization stage is carried out in presence of a highly stereospecific heterogeneous Ziegler-Natta catalyst. The Ziegler-Natta catalysts suitable for producing the propylene random copolymers of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP1272533 and in the international patent application WO0063261.

The random copolymers of propylene with ethylene of the present invention can be prepared by polymerisation in one or more polymerisation steps. Such polymerisation is preferably carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing propylene polymers with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are 1,3-diethers of formula:

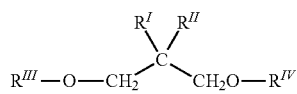

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl) fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a MgCl$_2$.nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or SO$_4$ or SO$_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si(OCH$_3$)$_2$, (cyclohexyl)(methyl)Si(OCH$_3$)$_2$, (cyclopentyl)$_2$Si(OCH$_3$)$_2$, (phenyl)$_2$Si(OCH$_3$)$_2$ and (1,1,2-trimethylpropyl)Si(OCH$_3$)$_3$, which is preferred.

1,3-diethers having the formulae described above can also be used advantageously. If the internal donor is one of these diethers, the external donors can be omitted.

In particular, even if many other combinations of the previously said catalyst components may allow to obtain polymers according to the present invention, the random copolymers of propylene with ethylene are preferably prepared by using catalysts containing a phthalate as inside donor and (cyclopentyl)$_2$Si(OCH$_3$)$_2$ as outside donor, or the said 1,3-diethers as inside donors.

The polymerization process can be carried out in gas phase and/or in liquid phase, in continuous or batch reactors, such as fluidized bed or slurry reactors. The catalytic system can be pre-contacted (pre-polymerized) with small amounts of olefins. The molecular weight of the propylene polymer composition is regulated by using known regulators, such as hydrogen.

According to a preferred embodiment, the propylene-ethylene copolymer of the invention is produced by a gas-phase polymerization process carried out in at least two interconnected polymerization zones. Said polymerization process is described in the European patent EP1012195.

The propylene copolymer is obtainable by polymerizing propylene and ethylene by a gas-phase polymerization process carried out in at least two interconnected polymerization zones, the process comprising feeding propylene and ethylene (and optionally also other olefins of formula CH$_2$=CHR in which R is an alkyl group containing from 2 to 10 carbon atoms other than propylene) to said polymerization zones in the presence of a highly stereospecific heterogeneous Ziegler-Natta catalyst system under reaction conditions and collecting the polymer product from said polymerization zones, in which process the growing polymer particles flow upward through one of said polymerization zones (riser) under fast fluidization conditions, leave said riser and enter another polymerization zone (downcomer) through which they flow downward under the action of gravity, leave said downcomer and are reintroduced into the riser, thus establishing a circulation of polymer between the riser and the downcomer, whereby means are provided which are capable of totally or partially preventing the gas mixture present in the riser from entering the downcomer and a gas and/or liquid mixture having a composition different from the gas mixture present in the riser is introduced into the downcomer.

In the polymerization process, the growing polymer flows through a first polymerization zone, represented by the riser, under fast fluidization conditions. The two polymerization zones are appropriately interconnected. The growing polymer and the gaseous mixture leaving the riser are conveyed to a separation zone whereby the gaseous mixture is separated from the growing polymer. From the separation zone, the growing polymer enters the second polymerization zone, represented by the downcomer, where the growing polymer flows in a densified form under the action of gravity. The growing polymer particles leave said second polymerization zone and are reintroduced into said first polymerization zone, thus establishing a circulation of polymer between the two polymerization zones. The material balance is maintained by feeding in monomers and catalysts and discharging polymer powder. Generally, the conditions of fast fluidization in the first polymerization zone is established by feeding the monomers gas mixture below the point of reintroduction of the growing polymer into said first polymerization zone. The velocity of the transport gas injected into the riser has to be higher than the transport velocity under the operating conditions, and depends on the gas density and the particle size distribution of the solid. It is preferably comprised between 0.5 and 15 m/s, more preferably between 0.8 and 5 m/s. Generally, the various catalyst components are fed to the riser through a line that is preferably placed in the lower part of the riser. However, they can be fed at any other point of the riser, as well as at any point of the downcomer or of the interconnecting sections. The gas mixture that is separated from the circulating solid in the separation zone must be totally or partially prevented to enter the downcomer. This can be achieved by feeding a gas and/or liquid into the downcomer through a line placed at a suitable point of said downcomer, preferably in the upper part thereof, through one or more introduction lines. The gas and/or liquid mixture to be fed into the downcomer should have an appropriate composition, different from that of the gas mixture present in the riser. The said gas and/or liquid mixture partially or totally replaces the gas mixture entrained with the polymer particles entering the downcomer. The flow rate of this gas feed can be regulated so that a flow of gas counter-current to the flow of polymer particles is originated in the downcomer, particularly at the top thereof, thus acting as a barrier to the gas mixture coming from the riser which is entrained among the polymer particles. According to a particularly preferred embodiment, the gas and/or liquid mixture of different composition to be fed into the downcomer is fed in partially or totally liquefied form. More preferably, said gas and/or liquid mixture consists of liquefied propylene.

Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C., preferably from 70° C. to 90° C. The process can be carried out under operating pressure of between 0.5 and 10 MPa, preferably between 1.5 and 6 MPa. The polymerization apparatus suitable for carrying out the process is described in details in the International Patent Application WO00/02929, in particular in FIG. 4. The molecular weight distribution of the growing polymers can be conveniently tailored by metering customary molecular weight regulators, particularly hydrogen, in different proportion into at least one polymerization zone, preferably into the riser.

The propylene-ethylene copolymers of the present invention may further comprise additives commonly employed in the polyolefin field, such as antioxidants, light stabilizers, nucleating agents, antiacids, and colorants.

The propylene-ethylene copolymers of the invention can be successfully employed for the manufacture of sheets and/or films. In particular, they are especially useful in the manufacture of cast films or sheets.

The cast films or sheets of the present invention can be mono- or multilayer and are prepared according to well-known processes and techniques, such as through chill roll casting.

In the chill roll casting process, the melt emerging from a flat film die is poured onto either a chrome plated, highly polished or matt finish chill-roll.

The mono- or multilayer films or sheets according to the invention may be used to manufacture a variety of articles, particularly in packaging applications, or for the manufacturing of pharmaceutical blisters.

The following examples are given to illustrate and not to limit the present invention.

EXAMPLES

The data of the propylene polymer materials were obtained according to the following methods:

Comonomer (C2) Content
By IR spectroscopy.
Melt Flow Rate (MFR)
Determined according to ISO 1133 (230° C., 2.16 Kg)
Polydispersity Index (PI)

To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second.

The sample is placed between two round shape plates and heated up to 200° C. The test is carried out under a nitrogen environment to avoid oxidation of the polymer through the test.

Data

From the modulus separation value, the PI can be derived using the following equation:

$$PI = 54.6 \times (\text{modulus separation})^{-1.76}$$

Wherein the modulus separation (MS) is defined as:

$$MS = (\text{frequency at } G'=500 \text{ Pa})/(\text{frequency at } G''=500 \text{ Pa})$$

Wherein G' is the storage modulus and G" is the loss modulus.

PI number is a dimensionless number.
Flexural Modulus
Determined according to ISO 178.
Tensile Tests (Stress and Elongation at Yield and at Break)
Determined according to ISO 527.
Tensile Tests for Film
Determined according to ASTM D882.
Elmendorf Tear Test
Determined according to ASTM D1922.
Izod Impact Strength
Determined according to ISO 180/1A.
Haze (On 1 mm Plaque)

According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec Second stage 10 sec
Cooling time: 20 sec
Mold water temperature: 40° C.
Melting Temperature and Crystallization Temperature The melting and crystallization temperatures were measured by Differential Scanning calorimetry (DSC) on a Perkin Elmer DSC-1 calorimeter equipped with the Pyris 1 software performing scans in a flowing $N_2$ atmosphere. The DSC apparatus was previously calibrated at indium and zinc melting points with particular attention in determining the baseline with required accuracy. The preparation of the samples, for calorimetric investigations, was performed by cutting them into small pieces by using a cutter. The weight of the samples in every DSC crucible was kept at 6.0±0.5 mg.

In order to obtain the melting and crystallization temperatures of the copolymers, the weighted sample was sealed into aluminium pans and heated to 180° C. at 20° C./minute. The sample was kept at 180° C. for 5 minutes to allow a complete melting of all the crystallites, and then cooled down to −20° C. at 20° C./minute. After standing 2 minutes at −20° C., the sample was heated for the second time to 180° C. at 20° C./min.

Examples 1-3

The solid catalyst used to obtain the propylene-ethylene copolymers was prepared according to the Example 5, lines 48-55 of the European Patent EP728769. Triethylaluminium (TEAL) was used as co-catalyst and dicyclopentyldimethoxysilane as external donor.

The propylene-ethylene copolymers were prepared in a polymerization process carried out in a gas-phase polymerization reactor comprising two interconnected polymerization zones, a riser and a downcomer, by using the "barrier feed" of liquid propylene according to the description of EP1012195, in order to differentiate the hydrogen and ethylene concentration between the riser and the downcomer. Process data are summarized in Table 1.

The polymer particles exiting from the reactor were subjected to a steam treatment to remove the unreacted monomers and dried.

The propylene-ethylene copolymers were added with the additives indicated in Table 2 and extruded in a twin-screw extruder Berstorff (L/D=33) under the following operating conditions:

Temperature of the feeding section: 190-210° C.
Melt temperature: 233-237° C.
Temperature of the die section: 210° C.
Flow rate: 15 Kg/h
Rotational speed: 250 rpm The properties measured on the samples are collected in the same Table 2.

Comparative Example

The comparative example (C.E.) reported in Table 2 refers to a commercial propylene-ethylene random copolymer for cast film applications.

TABLE 1

|  |  | Example 1 | Example 2 | Example 3 |
|---|---|---|---|---|
| TEAL/catalyst | wt/wt | 5.5 | 6 | 6.5 |
| TEAL/external donor | wt/wt | 3 | 3 | 3.6 |
| Temperature | °C. | 72 | 72 | 72 |
| Pressure | barg | 27 | 27 | 27 |
| Slip holdup [riser] | wt % | 39 | 39 | 39 |
| [downcomer] | wt % | 61 | 61 | 61 |
| $H_2/C_3^-$ [riser-downcomer] | mol/mol | 0.100-0.002 | 0.085-0.005 | 0.079-0.004 |
| $C_2^-/(C_2^- + C_3^-)$ [riser-downcomer] | mol/mol | 0.053-0.007 | 0.051-0.004 | 0.048-0.009 |

TABLE 2

|  |  | Example 1 | Example 2 | Example 3 | C.E. |
|---|---|---|---|---|---|
| Formulation |  |  |  |  |  |
| CaSt | ppm | 420 | 420 | 420 |  |
| Erucamide | ppm | 1800 | 1800 | 1800 |  |
| Gasil AB710 | ppm | 1800 | 1800 | 1800 |  |
| Irganox B215 | ppm | 1500 | 1500 | 1500 |  |
| Characterization |  |  |  |  |  |
| MFR | g/10 min | 5.4 | 5.1 | 3.6 | 5.8 |
| Ethylene content | % | 4.6 | 4.1 | 3.8 | 3 |
| PI |  | 4.9 | 4.3 | 4.4 | 3.3 |
| Tm | °C. | 143.5 | 144.6 | 144.2 | 143.9 |
| Tc | °C. | 95.7 | 97.3 | 97.4 | 94.9 |
| Haze (1 mm) | % | 51.2 | 52.6 | 50.5 | 56.1 |
| Izod impact @ 23 c | kJ/m² | 6.1 | 6.3 | 6.4 | 4.9 |
| Izod impact @ 0 c | kJ/m² | 4.4 | 4.1 | 3.8 | 3.3 |
| Izod impact @ −20 c | kJ/m² | 2.8 | 1.5 | 2.1 | 2.1 |
| Flex. Modulus | MPa | 800 | 863 | 909 | 926 |
| Stress @ Yield | MPa | 23.9 | 25 | 26.2 | 26.7 |
| Elongation @ Yield | % | 14 | 13.9 | 13.1 | 13.5 |
| Stress @ Break | MPa | 30.1 | 31.8 | 32.8 | 31 |
| Elongation @ Break | % | 830 | 902 | 820 | 927 |

From the data collected in Table 2 it can be seen that the random copolymers of the invention show an improved balance of mechanical, thermal and optical properties.

Specifically, the copolymers exhibit improved levels of Haze and of Izod impact resistance, while maintaining the same melting temperature.

Film Preparation and Characterization

Cast films with a thickness of 50 μm were prepared by extruding each polymer composition in a single screw Collin extruder (length/diameter ratio of screw:30) at a film drawing speed of 7 m/min and a melt temperature of 210-250° C. The properties of the films thus obtained are summarized in Table 3 below:

TABLE 3

|  |  | Example 1 | Example 2 | Example 3 | C. E. |
|---|---|---|---|---|---|
| Tensile modulus MD | MPa | 370 | 435 | 448 | 395 |
| Tensile modulus TD | MPa | 360 | 431 | 410 | 416 |
| Stress @ Yield MD | MPa | 15.5 | 17.7 | 17.2 | 16.8 |
| Elongation @ Yield MD | % | 17 | 15.4 | 14 | 14 |
| Stress @ Break MD | MPa | 42.7 | 43.6 | 43.2 | 34.3 |
| Elongation @ Break MD | % | 920 | 860 | 805 | 800 |
| Stress @ Yield TD | MPa | 14.8 | 16.6 | 15.8 | 17.2 |
| Elongation @ Yield TD | % | 12.6 | 13 | 12 | 12.7 |
| Stress @ Break TD | MPa | 33.9 | 37.7 | 33.9 | 38.2 |
| Elongation @ Break TD | % | 830 | 840 | 795 | 890 |
| Elmendorf MD | gf | 113 | 117 | 117 | 141 |
| Elmendorf TD | gf | 402 | 420 | 457 | 340 |

The invention claimed is:

1. A copolymer of propylene with ethylene and optionally other olefins of formula $CH_2=CHR$ in which R is an alkyl group containing from 2 to 10 carbon atoms, said copolymer comprising from 3.5% to 6.5% by weight of ethylene and having a melt flow rate according to ISO 1133 (230° C., 2.16 Kg) of less than 10 g/10 min and a melting temperature (Tm), determined by DSC, satisfying the following relation:

$$146° C. \leq Tm+C \leq 150° C.$$

wherein C is the quantity (by weight) of ethylene.

2. The copolymer according to claim 1, wherein the content of ethylene is comprised in the range from 3.8% to 5.5% by weight.

3. The copolymer according to claim 1, wherein the melting temperature (Tm) is comprised in the range from 142° C. to 145° C.

4. The copolymer according to claim 1, wherein the melt flow rate is comprised in the range from 3 g/10 min to 9 g/10 min.

5. The copolymer according to claim 1, wherein said copolymer has an Izod impact strength, measured according to ISO 180/1A at 23° C., equal to or higher than 5.0 kJ/m², and/or an Izod impact strength, measured according to ISO 180/1A at 0° C., equal to or higher than 3.5 kJ/m², and/or an Izod impact strength, measured according to ISO 180/1A at −20° C., equal to or higher than 1.5 kJ/m².

6. The copolymer according to claim 1, wherein said copolymer has a flexural modulus equal to or higher than 800 MPa.

7. A mono- or multilayer film or sheet having at least one layer comprising the copolymer according to claim 1.

8. A mono- or multilayer cast film or sheet according to claim 7.

9. An article comprising the mono- or multilayer film or sheet according to claim 7.

* * * * *